United States Patent
Ye et al.

(10) Patent No.: US 9,086,776 B2
(45) Date of Patent: Jul. 21, 2015

(54) MODIFYING AVATAR ATTRIBUTES

(75) Inventors: Lan Ye, Redmond, WA (US); Praful Chavda, Redmond, WA (US); Alexandre Grigorovitch, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 958 days.

(21) Appl. No.: 12/749,074

(22) Filed: Mar. 29, 2010

(65) Prior Publication Data

US 2011/0239143 A1   Sep. 29, 2011

(51) Int. Cl.
    *G06F 3/00*     (2006.01)
    *G06F 3/048*    (2013.01)

(52) U.S. Cl.
     CPC ..................... *G06F 3/048* (2013.01)

(58) Field of Classification Search
     USPC .......................................... 715/764
     See application file for complete search history.

(56) References Cited

U.S. PATENT DOCUMENTS

| | | | |
|---|---|---|---|
| 7,429,989 B2 | 9/2008 | Kang et al. | |
| 8,555,346 B2 * | 10/2013 | Bokor et al. | 726/4 |
| 2005/0223328 A1 | 10/2005 | Ashtekar et al. | |
| 2007/0113181 A1 | 5/2007 | Blattner et al. | |
| 2008/0297515 A1 * | 12/2008 | Bliss | 345/473 |
| 2009/0094535 A1 * | 4/2009 | Bromenshenkel et al. | 715/757 |
| 2009/0144639 A1 | 6/2009 | Nims et al. | |
| 2009/0167767 A1 | 7/2009 | Shoval | |
| 2009/0216691 A1 | 8/2009 | Borzestowski et al. | |
| 2009/0251488 A1 | 10/2009 | Clavel | |
| 2009/0285483 A1 | 11/2009 | Guven et al. | |
| 2009/0315893 A1 * | 12/2009 | Smith et al. | 345/473 |
| 2010/0100828 A1 * | 4/2010 | Khandelwal et al. | 715/757 |
| 2010/0131864 A1 * | 5/2010 | Bokor et al. | 715/757 |
| 2010/0169801 A1 * | 7/2010 | Blattner et al. | 715/758 |
| 2010/0227682 A1 * | 9/2010 | Reville et al. | 463/29 |
| 2011/0004481 A1 * | 1/2011 | Jones | 705/1.1 |

FOREIGN PATENT DOCUMENTS

WO    2004053799 A1    6/2004

OTHER PUBLICATIONS

Shin, "A Tactile Emotional Interface for Instant Messenger Chat", Human Interface, Part II, HCII 2007, Lecture Notes in Computer Science, Aug. 2007, pp. 166-175, vol. 4558/2007, Springer-Verlag Berlin Heidelberg.

Toyama, Kentaro, et al., "Probabilistic Tracking in a Metric Space," Eighth International Conference on Computer Vision, Vancouver, Canada, vol. 2, Jul. 2001, 8 pages.

* cited by examiner

*Primary Examiner* — Ryan Pitaro (74) *Attorney, Agent, or Firm* — Jim Banowsky; Kate Drakos; Micky Minhas (57) ABSTRACT

Techniques are disclosed herein for changing a user's avatar attributes based on information that is pertinent to the user and that comes from a variety of sources. The user's electronic device may contain a multitude of information about the user, their lifestyle, their current mood, etc. Embodiments provide an application programming interface (API) that allows various applications on the user's electronic device, or elsewhere, to communicate with an avatar platform such that avatar attributes may be changed based on information from a wide variety of applications.

20 Claims, 7 Drawing Sheets

MODIFYING AVATAR ATTRIBUTES

BACKGROUND

An avatar is a computer user's representation of herself or alter ego. Avatars may be three-dimensional (3D) or two-dimensional (2D). For example, a user may have a 3D avatar in a computer game. As another example, a user may have a 2D avatar in the form of an "icon" that might be used in an instant messaging application or other environment.

Some avatars have a set of customizable attributes. For example, a video game might allow the user to customize the avatar's clothes, hair, eye color, weight, etc. As a specific example, the user might purchase a set of digital clothes to customize the avatar's appearance in the video game. As another example, a user could select attributes for their avatar in an instant messaging program.

The user's avatar is not necessarily static. Some avatars are animated, meaning that the avatar changes its appearance over time. For example, an avatar might consist of a number of images, which are played in the same sequence over and over. As a simple example, a "smiley face" icon might repeatedly sequence between a frown and a smile. As a more complex example, an avatar that resembles a person might jump up and down.

In some cases, the avatar changes in a way that is not simply a repetition of a sequence of images. For example, some programs alter an avatar based an actions within the program. Using a video game as an example, the user's avatar might be depicted as being wounded if the user has suffered some loss in the video game. As another example, an instant messaging program may provide an animated 3D avatar that talks as messages are typed or read.

However, despite the use of avatar's in computer programs, video games, and the like, there remain limitations on the input that can be used to change the attributes of avatars.

SUMMARY

Techniques are disclosed herein for changing a user's avatar attributes based on information that is pertinent to the user. The information may come from a variety of sources. For example, the user's electronic device may contain a multitude of information about the user, their lifestyle, their current mood, etc. Embodiments provide an application programming interface (API) that allows various applications on the user's electronic device, or elsewhere, to communicate with an avatar platform such that avatar attributes may be changed based on information from a wide variety of applications.

One embodiment is a machine implemented method of presenting a user's avatar. The method comprising exposing an interface at a first application on an electronic device. The interface allows other applications to request that a user's avatar be presented with specified attributes. The interface allows a plurality of different attributes to be selected. The first application receives an identifier of a first attribute of the plurality of attributes from a second application. The user's avatar is presented on an electronic device based on the first attribute.

One embodiment is a machine implemented method of presenting a user's avatar. The method comprising determining, by a first application, that a user's avatar should be updated through an interface to a second application. The interface allows a request that an avatar be presented with specified attributes. The interface allows a plurality of attributes to be selected. The first application determines a first attribute of the plurality of attributes for the user's avatar based on information that pertains to the user. The first application transmits an identifier of the first attribute to the second application. The user's avatar is presented on an electronic device based on the first attribute.

One embodiment is an apparatus comprising a presentation device, a processor coupled to the presentation apparatus, and a computer readable storage media coupled to the processor. The computer readable storage media having computer readable instructions stored thereon, which when executed on the processor cause the processor to implement a platform for presenting avatars on the presentation device. The platform exposes an application programming interface that allows software applications to select from among a plurality of attributes to apply to an avatar. The platform receives a request from a software application on the electronic device to present a user's avatar with a first attribute of the plurality of attributes. The platform modifies the user's avatar based on the first attribute.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Techniques are disclosed herein for changing a user's avatar attributes based on information that is pertinent to the user. The information m ay pertain to real life events. For example, the user's electronic device may contain a multitude of information about the user, their lifestyle, their current mood, etc. Embodiments provide an application programming interface (API) that allows various applications on the user's electronic device, or elsewhere, to communicate with an avatar platform such that avatar attributes may be changed based on information from a wide variety of applications.

For example, a music application on an electronic device may use the API to instruct the avatar platform to cause the user's avatar to tap its feet when the user is listening to music. As another example, if a weather application determines that the forecast calls for rain at the user's location, then the weather application may use the API to instruct the avatar platform to cause the avatar to carry an umbrella. Note that the user's avatar might be presented in a wide range of applications. For example, the avatar could be presented in an instant messaging environment, a social networking website, etc.

Figure 1:
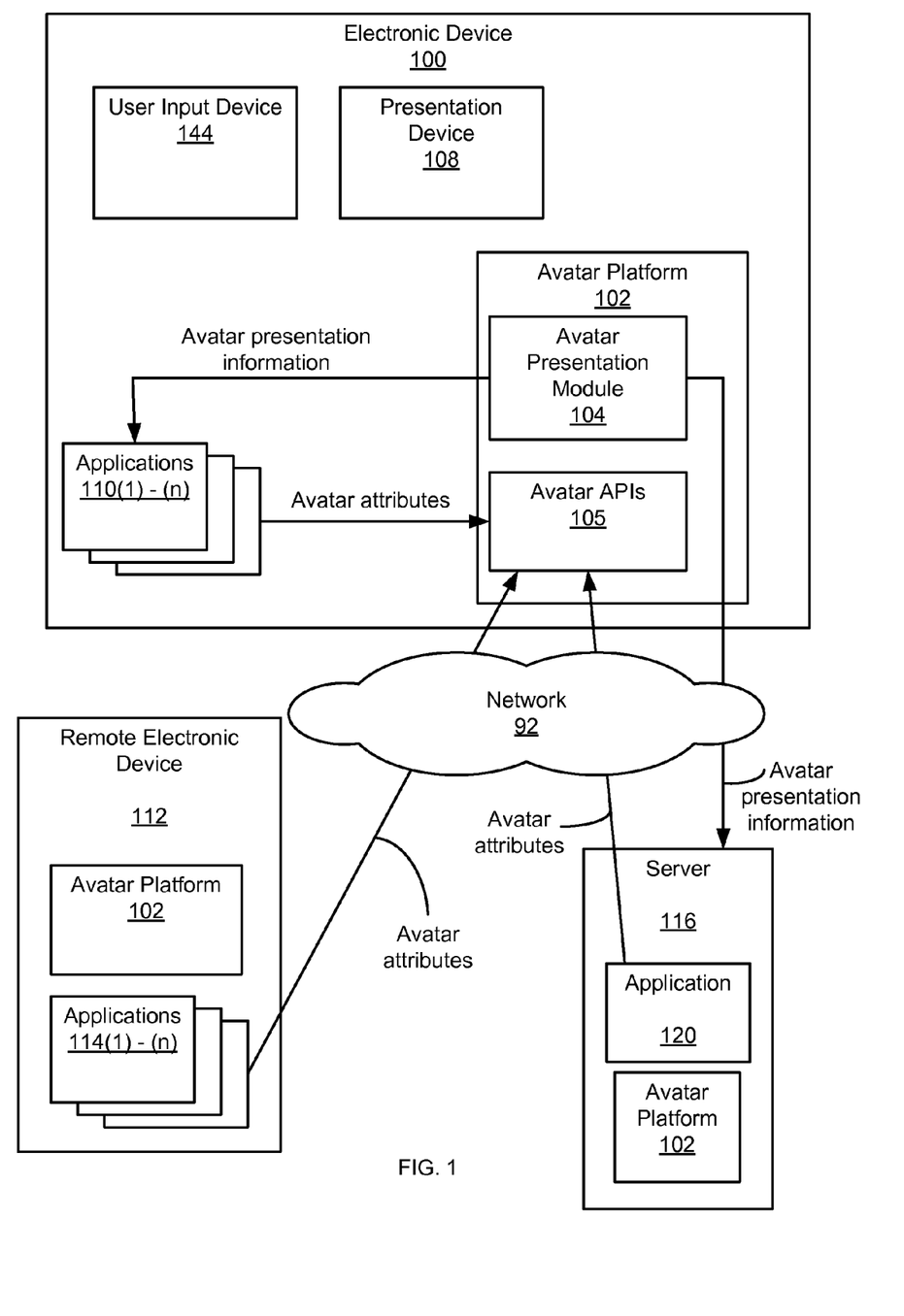
FIG. 1 depicts an example environment for changing avatar attributes based on information that pertains to a user that has an avatar.

FIG. 1 depicts an example environment for changing avatar attributes based on information that pertains to a user that has an avatar. The environment includes an electronic device 100, remote electronic device 112, server 116, and network 92. The electronic device 100 has an avatar platform 102, a number of software applications 110(1)-110(n), a presentation device 108, and a user input device 144. Other components of the electronic device 100 such as computer readable media and a processor are not depicted so as to not obscure the diagram. As non-limiting examples, the electronic device 110 might be a cellular telephone, a Tablet PC, personal digital assistant (PDA), a laptop computer, a desktop computer, etc. The remote electronic device 112 also includes an avatar platform 102 and its own applications 114. The server 112 contains an application 120. The network 92 could be any combination of wire line and wireless networks. For example, the network 92 could include a local area network (LAN), a wide area network (WAN), the Internet, etc.

The presentation device 108 is capable of displaying images and may also be capable of playing audio signals. As non-limiting examples, the presentation device 108 might be an LCD display, an LED display, a plasma display, etc. The presentation device 108 may also include an audio speaker. The user input device 144 allows a user to input data, commands, etc. As non-limiting examples, the user input device 144 may include a touch screen, a keypad or keyboard, a microphone, etc. In one embodiment, the display screen is capable of user input. In one embodiment, the user input device 144 responds to a human voice.

The avatar platform 102 includes an avatar presentation module 104 and avatar APIs 105. The avatar presentation module 104 is able to present avatars on the presentation device 108 on the electronic device 100. Note that the avatar presentation module 104 may cooperate with other software on the electronic device 100 that assists in the rendering of the avatar on the presentation device 108. For example, the avatar platform 102 may be part of an operating system, which may have software that assists in the rendering of the avatars. However, the avatar platform 102 may reside outside of the operating system.

The avatar presentation module 104 is also able to send avatar presentation information to other applications 110 on the electronic device 100 to cause those applications 110 to present the user's avatar on the presentation device 108 on the electronic device 100. For example, the avatar presentation module 104 may communicate with an instant messaging application 110 on the electronic device 100 to control how the avatar is presented within an instant messaging environment. The avatar presentation information may be any information (e.g., data and/or executable instructions) that allows an avatar to be presented, such as one or more images, software code (e.g., JAVA, XML, etc.). Moreover, the avatar presentation module 104 is able to send avatar presentation information to applications 120 on a server 116 to cause the server 116 to present the avatar. As an example, the presentation module 104 might communicate with an application 120 on server 116 to control how the avatar is presented within a social networking website. Likewise, the applications 110 on the electronic device 100 may send avatar presentation information to the server 116.

The APIs 105 allows applications 110(1)-110(n) on the electronic device 110 to impact how avatars are presented. In one embodiment, an application 110 sends one or more avatar attributes to the avatar platform 102 to control those attributes of the avatar. As an example, a weather application 110 sends the attribute "umbrella." In response, the avatar presentation module 104 causes the user's avatar to carry an umbrella. Note that the applications 110 do not need to specify all of the avatar attributes. For example, the user might specify what attributes the avatar is to have absent any specific requests through the API 105 to modify the user's avatar.

Note that applications that are not on the electronic device 100 may also impact how the avatars are presented. For example, the applications 114(1)-114(n) on the remote device 112 may have an impact on how avatars are presented at the electronic device 100. In one embodiment, a remote application 114 sends an avatar attribute to the avatar platform 102. Likewise, the applications 110(1)-110(n) on the electronic device 100 may send avatar attributes to an avatar platform 102 on the remote electronic device 112 or the server 116 to impact how avatars are presented. Furthermore, an application 120 on the server 116 can send avatar attributes to the avatar platform 102 on the electronic device 100 to impact how avatars are presented.

The applications 110, 120, on the electronic device 100 and the server 116 could include essentially any software application. Examples include, but are not limited to, an email application, an instant messaging application, a calendar application, a contacts application, a music player, a stock application, a traffic application, a weather application. Note that the applications are not necessarily stand alone applications. For example, the calendar application might be a component within the email application.

Figure 2:
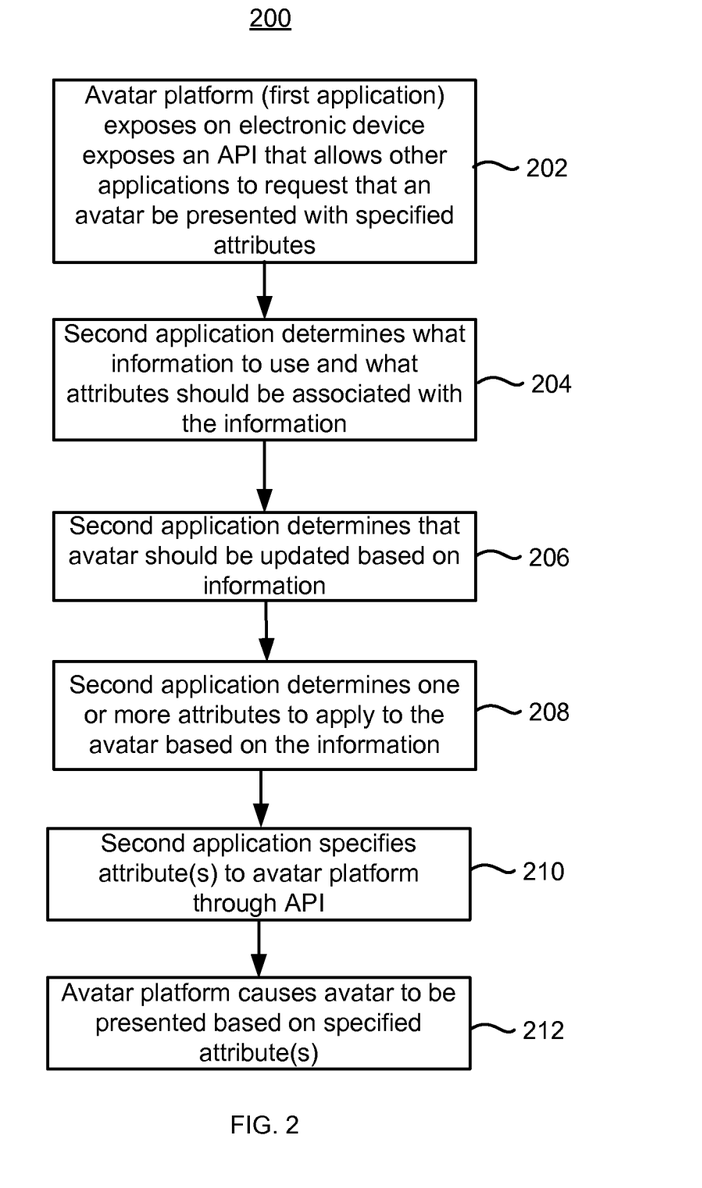
FIG. 2 is a flowchart illustrating one embodiment of a process of presenting avatars based on information that pertains to a user.

FIG. 2 is a flowchart illustrating one embodiment of a process 200 of presenting avatars based on information that pertains to a user. In some embodiments, the process 200 is implemented by executing computer readable instructions on one or more processors. In some embodiments, all of the steps of process 200 are performed at a single device, such as electronic device 100. In some embodiments, the steps of process 200 are performed on multiple electronic devices. For example, a user at electronic device 100 may send a gift of an avatar attribute to a user at the remote electronic device 112. When describing process 200, reference will be made to elements in FIG. 1; however, it will be understood that process 200 is not limited to the example environment of FIG. 1. In process 200 describes an application using the APIs 105 to affect the avatar based on information that pertains to a user. That application could be a local application 110 on the user's device 100, a remote application 114 on a remote device 112, or an application 120 on a server 116.

In step 202, the avatar platform 102 (e.g., first application) on the electronic device 100 exposes the APIs 105. The APIs 105 allow the other applications 110 on the electronic device 100, as well as other applications 114, 120 on a remote electronic device 112 or server 116 to request that an avatar be presented with specified attributes. The APIs 105 allow different attributes for the avatar to be selected. For example, the attribute "umbrella" can be specified for the avatar.

In step 204, a second application 110, 114, 120 determines what information that pertains to a user that it use to affect the user's avatar. The second application 110, 114, 120 also determines what attributes are pertinent for the information. In one embodiment, the second application 110, 114, 120 presents the user with an interface to select what information might be pertinent to determining an update to the user's avatar. The interface may also allow the user to select what avatar attribute is to change and how. For example, a weather application may allow the user to choose to have their avatar carry an umbrella if the weather forecast calls for rain. As another example, the user may choose to have their avatar wear sunglasses if the weather forecast calls for sunny skies. In this example, the weather forecast is the information that pertains to the user. The avatar attributes may be "umbrella" or "sunglasses." Further details of an application determining useful information how to relate that information to attributes are discussed in connection with FIG. 4.

Note that the second application 110, 114, 120 could determine, without user input, what information might be used to affect the user's avatar, as well as what attributes relate to the information. For example, the weather application 110 might determine, without user input, that the information regarding the weather at the user's location might be related to the user's mood. The weather application 110 might also determine, without user input, that the avatar should have an attribute of "sad" if the weather is rainy.

In step 206, the second application 110, 114, 120 determines that a user's avatar should be updated based information that pertains to the user. For example, a weather application might check the weather every morning at 7 AM and if certain conditions are met, then the user's avatar should be updated. Those conditions could be that the user has specified that if it is raining in the morning then the avatar should be changed to reflect this. Note that any conditions could be used to trigger the avatar update. Using the weather example, the weather program determine that the user's avatar should be updated whenever a major downpour is in the user's area.

In step 208, the second application 110, 114, 120 determines an avatar attribute to be affected by the information. As mentioned, the API 105 could specify many different avatar attributes. As an example, the weather application determines that the avatar should have the attribute "umbrella" or "sunglasses" based on the weather report. Therefore, the selection of the attribute may be conditioned upon the information.

In step 210, the second application 110, 114, 120 sends an identifier of the attribute to the avatar platform 102 via the API 105. In one embodiment, the second application 110, 114, 120 sends the identifier of the attribute to the avatar platform 102 on the electronic device 100. For example, an email application 100 on a user's electronic device sends the attribute identifier such that the avatar can be affected on the presentation device 108 of the electronic device 100. In one embodiment, a local application 110 sends the identifier of the attribute to an avatar platform 102 on a remote electronic device 112. For example, an application 110 on a user's electronic device 100 sends the identifier of the attribute such that the avatar of a friend can be affected at the friend's electronic device 112.

In step 212, the avatar platform 102 causes the avatar to be presented based on the received attribute or attributes. Note that this may affect how the user's avatar is presented in a number of different applications and/or electronic devices. For example, avatar platform 102 might send computer executable instructions and/or data to an email application on the user's electronic device 100 that instruct the email application how to present the avatar. As another example, the avatar platform 102 might send computer executable instructions and/or data to a server 116 that instructs the server how to present the avatar on a social networking website.

Figure 3:
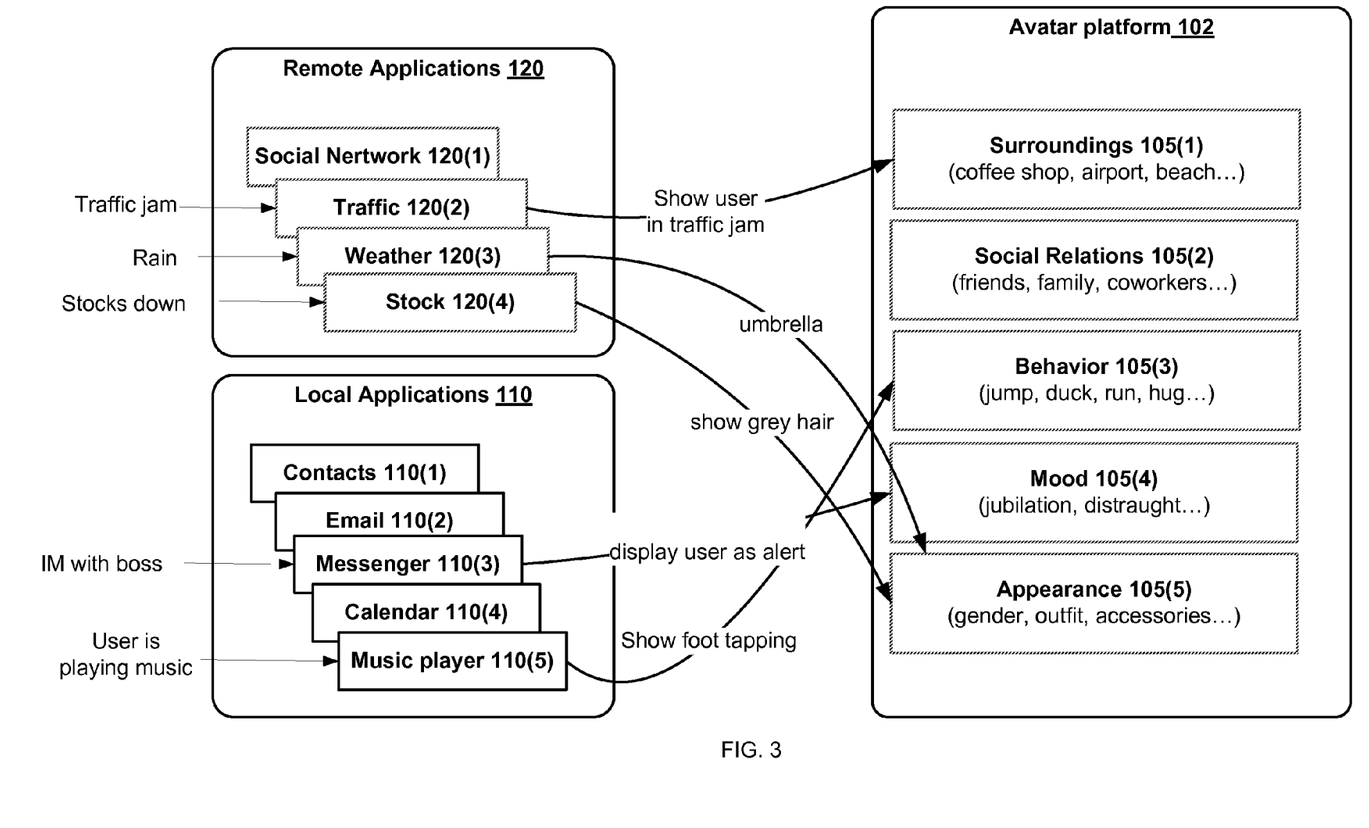
FIG. 3 is one a diagram the depicts example applications sending information to an avatar platform through an example API.

FIG. 3 is one a diagram the depicts example applications 110, 120 sending information to an avatar platform 102 through an example API 105. The diagram provides more details of the example applications 110 on the electronic device 100 of FIG. 1, example server applications 120, as well as more details of the example API 105 in the avatar platform. Note that the remote applications 114 on the remote device may be similar to the local applications 110. Also note that FIG. 3 depicts one example and that many other possibilities exist.

The APIs 105 in the avatar platform 102 are divided into five example categories 105(1)-105(5), including surroundings 105(1), social relations 105(2), behavior 105(3), mood 105(4), and appearance 105(5). Each avatar category has a number of attributes. For example, the surroundings category has attributes of "coffee shop," "airport," "beach," etc. The social relations category has attributes of "friends," "family," "co-workers," etc.

The avatar platform 102 is able to present the avatar in a suitable manner given the selection of the attributes. For example, if the coffee shop attributes is specified in the API 105, then the avatar platform 102 presents the user's avatar in a coffee shop. Note that only a single attribute needs to be selected in the API 105. The avatar platform 102 may rely on default values for the rest of the avatar's attributes. For example, the user may establish the way they want their avatar to appear absent any special instructions from applications 110, 114, 120 through the API.

The local applications 110 are applications that are on the same electronic device 100 as the avatar platform 102. The remote applications 120 are on another device, such as a server 120. The following examples will be used to help illustrate principles of an embodiment.

The weather application 120(1) determines that it is going to rain today so it sends the attribute "umbrella" to the avatar platform 102. Specifically, the weather application 120(1) sends an identifier (e.g., numeric value) that is associated with "umbrella." The avatar platform 102 may be capable of presenting many different types of umbrellas. In one embodiment, the API 105 allows umbrellas to be specified generically or specifically in a multi-byte code. For example, the first byte may specify the attribute "umbrella" and the second byte may specify the type of umbrella. If the application sets the second byte to a default value, then no specific type of umbrella is specified. In this case, the avatar platform 102 may select the specific type of umbrella based on considerations such as other attributes of the avatar, where the avatar is to be presented, etc. Therefore, the API 105 may allow the other applications 110, 114, 120 to have a certain level of granularity in specifying the attribute.

The traffic application 120(2) determines that the user is in a traffic jam. Therefore, the traffic application 120(2) sends a request to the avatar platform 102 to show the user's avatar in a traffic jam. In one embodiment, the traffic application 120(2) sends a numeric value that is defined in the API 105 as corresponding to showing an avatar in traffic.

The stock application 120(3) determines that the stock prices are down. This may be stock prices in general, a specific stock, the user's stock portfolio, etc. Therefore, the stock application 120(3) sends a request to the avatar platform 102 to show the user's avatar as having grey hair. In one embodiment, the stock application 120(3) sends a numeric value that is defined in the API 105 as corresponding to showing an avatar as having grey hair.

As previously mentioned, the applications 110 may be on the user's electronic device 100. The following are examples of such applications sending requests to affect the user's avatar. The messenger application 110(3) determines that the user is conducting an IM session with the user's boss. Therefore, the messenger application 110(3) sends a request to the avatar platform 102 to show the user's avatar as being alert. In one embodiment, the messenger application 110(3) sends a numeric value that is defined in the API 105 as corresponding to showing an avatar as being alert.

The music application 110(5) determines that the user is listening to music. Therefore, the music application 110(5) sends a request to the avatar platform 102 to show the user's avatar as tapping its feet. In one embodiment, the music application 110(5) sends a numeric value that is defined in the API 105 as corresponding to showing an avatar as tapping its feet.

Figure 4:
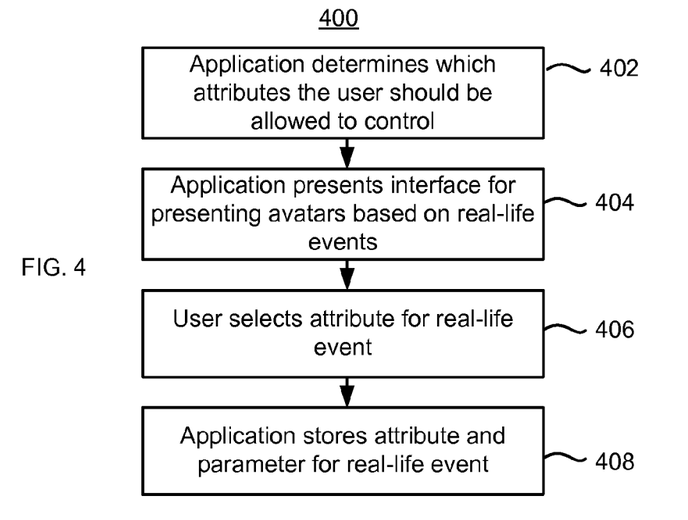
FIG. 4 is a flowchart of one embodiment of a process for an application determining what information for updating an avatar.

FIG. 4 is a flowchart of one embodiment of a process 400 for an application determining what information should be used to determine that an update to the user's avatar should occur and what attributes are associated with that information. Process 400 is one implementation of step 204 of process 200. Steps of process 400 might be performed by one or more of a local application 110 on the user's device 100, a remote application 114 on a remote device 112, an application 120 on a server 116 and an avatar platform 102 on any of the devices 100, 112, 116.

In step 402, the application 110, 114, 120 determines what attributes the user should be allowed to control. Referring to the example of FIG. 3, the API 105 may allow many different attributes to be specified. However, it may not be desirable or useful for a given application 110, 114, 120 to allow the user to control all of the possible attributes. For example, attributes related to the user's surroundings might not be very pertinent to a weather application 120(1). Note that the determination in step 402 may be made by the application 110, 114, 120 accessing a list of attributes that are stored in a computer readable medium. For example, a software developer might determine which of the attributes in the API 105 the user should be allowed to control. Note that this allows for a very powerful way to have a wide variety of information to be intelligently applied to affecting the user's avatar.

In step 404, the application 110, 114, 120 presents a user interface for the user to choose how information, which may pertain to the user's life, should affect the user's avatar. The information may pertain to real events that are pertinent the user's life such as the weather, user's surroundings, who the user is with, etc. The interface might contain a first list of events and a second list of attributes. For example, the events could include: rain, cold, sunny, fog. The attributes could include: umbrella, parasol, sunglasses, frown, smile, etc. Note that the events in this example are information that is available to a weather application. The user's electronic device may have a wide range of applications that have access to a wide range of information that could be pertinent to real-life events that the user might desire to have impact their avatar. Also, the user's electronic device may be in communication with a wide range of applications on a server 116 or other electronic device 112, which also may have access to pertinent information for affecting the user's avatar.

In step 406, the application 110, 114, 120 receives a selection of at least one of the events and one or more attributes for each event. For example, the user selects the event "rain" and the attributes "umbrella," and "frown" if the user wants their avatar to carry an umbrella and frown when it is raining The user may go on to select the event "sunny" and the attribute "sunglasses." Therefore, the user may select a variety of different weather events, along with how their avatar is to be affected by each weather event.

In step 408, the application 110, 114, 120 stores an indication of the one or more attributes that are to be associated with each event. For example, the attributes "umbrella" and "frown" are stored in association with the event "rain;" the attribute "sunglasses" is stored in association with the event "sunny," etc.

Figure 5:
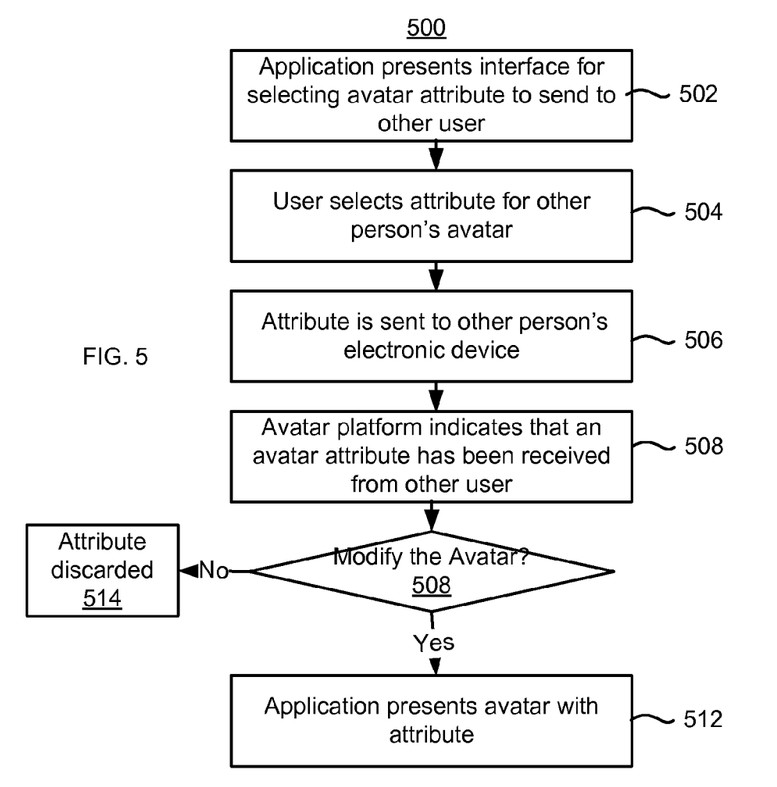
FIG. 5 is a flowchart of one embodiment of a process for an application allowing a user to send an avatar attribute to another user.

In one embodiment, the user is allowed to gift an avatar attribute to another user. For example, a mother might send an umbrella attribute to her daughter if it is raining so that the daughter's avatar does not get wet. FIG. 5 is a flowchart of one embodiment of a process 500 for an application allowing a user to send an avatar attribute to another user. Process 500 is one implementation of steps 206-212 of process 200. Steps of process 500 might be performed by one or more of a local application 110 on the user's device 100, a remote application 114 on a remote device 112, an application 120 on a server 116 and an avatar platform 102 on any of the devices 100, 112, 116.

In step 502, the application 110, 114, 120 presents an interface for selecting an avatar attribute to send to another user. For example, if the weather application 120(3) determines that it is raining the weather application 120(3) may present a graphical user interface that allows the user to select attributes to send to another user. In one embodiment, the user causes the interface to be presented. For example, when the user looks at the weather report the user decides to send an umbrella attribute to her daughter; and therefore, calls up the interface. In step 504, the user selects the attribute to send to the other user. Steps 502-504 are collectively one embodiment of steps 206-208 of process 200.

In step 506, the selected attribute is sent to the other person's electronic device. For example, the weather application 120(3) sends the umbrella attribute to the avatar platform 102 on the remote electronic device 112 by using the API 105. Step 506 is one embodiment of step 210 of process 200.

In step 508, the avatar platform 102 on the remote electronic device 112 presents a message that indicates that an avatar attribute has been received from another user. The message may ask the user whether their avatar should be updated based on the received attribute. If the user allows their avatar to be updated (step 510), then the avatar platform 102 present their avatar with the received attribute. For example, the daughter's avatar is presented with an umbrella. If the user denies the offer to apply the attribute to their avatar (step 510), then the avatar platform 102 discards the attribute (step 514). Steps 508-514 are one embodiment of step 212 of process 200.

In various embodiments, the electronic devices 100, 112, 116 execute computer readable instructions that are stored on computer readable media. For example, process 200, 400, and/or 500 may be implemented by executing, on a processor, instructions that are stored on a computer readable storage medium. Computer readable media can be any available media that can be accessed by the electronic devices. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the computer readable instructions and which can accessed by the electronic devices.

Figure 6:
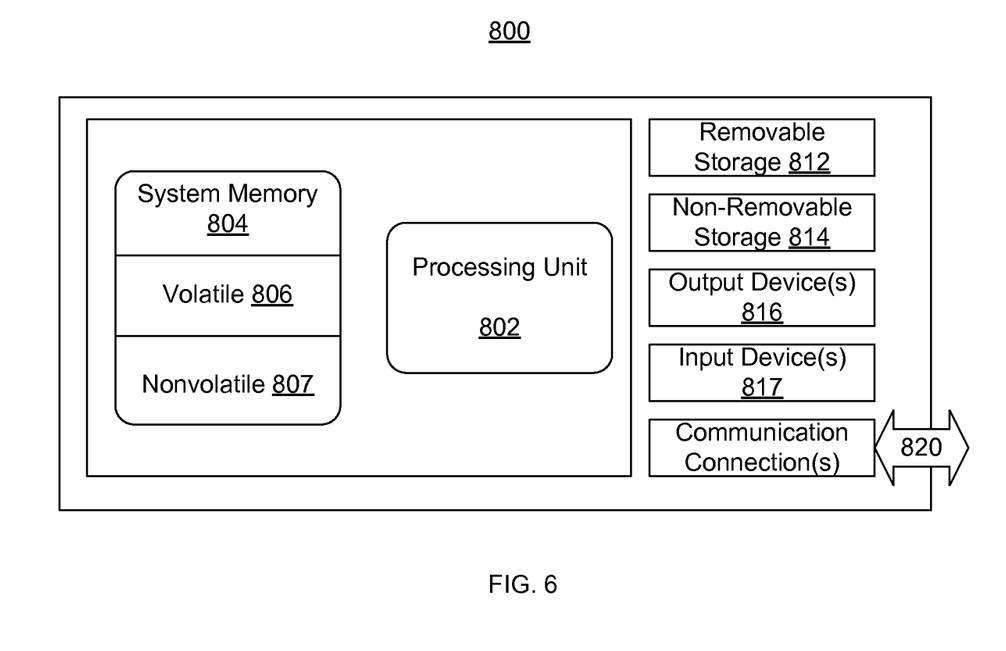
FIG. 6 depicts an example computer system that serves as a platform for embodiments of the present invention.

FIG. 6 depicts an example computer system 800 that may serve as a platform for embodiments of the present invention. For example, computer system 800 may serve as a platform for an electronic device such as a electronic device 100, remote electronic device 112, server 116, or other electronic device. In its most basic configuration, the computer 800 typically includes a processing unit 802 and memory 804. Pending on the exact configuration and type of computing device, memory 804 may be volatile (such as RAM), non-volatile (such as ROM, flash memory, etc.) or some combination of the two. Additionally, computer 800 may also have mass storage (removable 812 and/or non-removable 814) such as magnetic or optical disks or tape. In some embodiments, an avatar platform 102 and/or applications 110, 114 are stored in nonvolatile memory 807 or storage 812, 814 and executed on processing unit 802. Avatar platform 102 and/or applications 110, 114 program might also be loaded in volatile memory 806 and executed on processing unit 802.

Similarly, computer 800 may also have input devices 817 and/or output devices 816. Other aspects of device 800 may include communication connections 820 to other devices, computers, networks, servers, etc. using either wired or wireless media. For example, the electronic devices may have a wireless network connection that allows them to access the Internet or another network. The electronic devices may also have communication connections between themselves.

Figure 7:
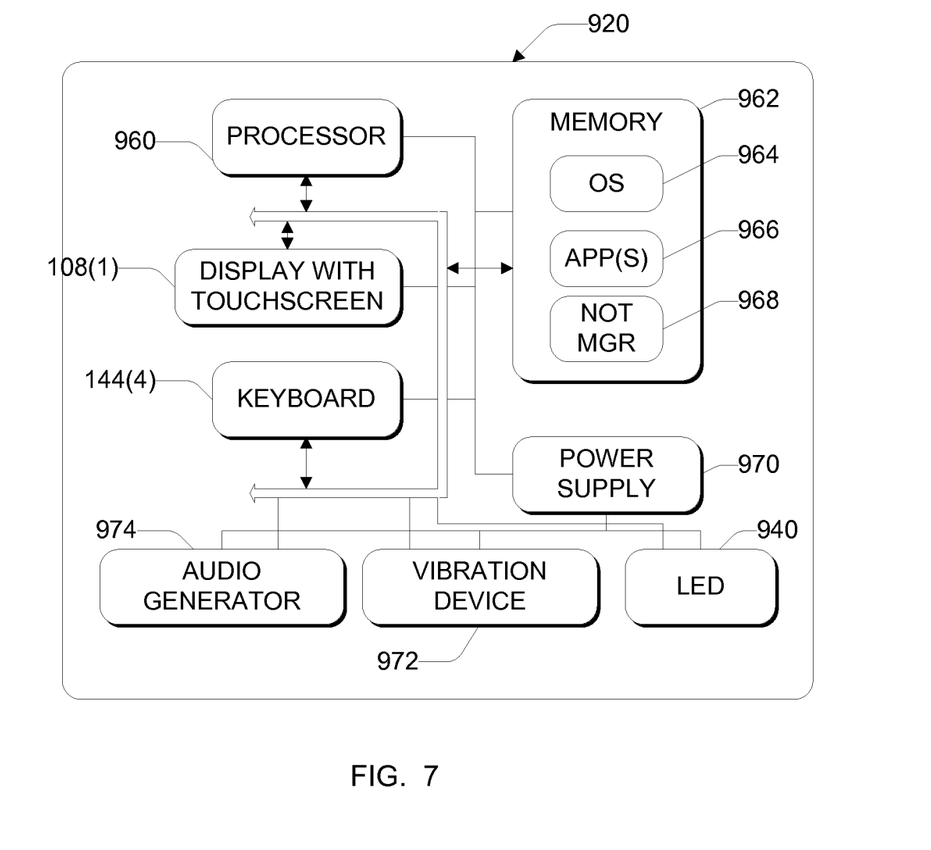
FIG. 7 shows functional components of a handheld computing device that serves as a platform for some embodiments of the present invention.

FIG. 7 shows functional components of a handheld computing device 920 that may serve as a platform for some embodiments. It has a processor 960, a memory 962, a display 108(1), and a keyboard 144(4). The memory 962 generally includes both volatile memory (e.g., RAM) and non-volatile memory (e.g., ROM, PCMCIA cards, etc.). An operating system 964 is resident in the memory 962 and executes on the processor 960. The handheld computing device 920 includes an operating system, such as the Windows® CE operating system from Microsoft Corporation or other operating system.

One or more application programs 966 are loaded into memory 962 and executed on the processor 960 by the operating system 964. Examples of applications include email programs, scheduling programs, PIM (personal information management) programs, word processing programs, spreadsheet programs, Internet browser programs, and so forth. In one embodiment, applications 966 include a shared workspace program.

The handheld computing device 920 also has a notification manager 968 loaded in memory 962, which executes on the processor 960. The notification manager 968 handles notification requests from the applications 966.

The handheld computing device 920 has a power supply 970, which is implemented as one or more batteries. The power supply 970 might further include an external power source that overrides or recharges the built-in batteries, such as an AC adapter or a powered docking cradle.

The handheld computing device 920 is also shown with three types of external notification mechanisms: an LED 940, a vibration device 972, and an audio generator 974. These devices are directly coupled to the power supply 970 so that when activated, they remain on for a duration dictated by the notification mechanism even though the processor and other components might shut down to conserve battery power. The LED 940 preferably remains on indefinitely until the user takes action. The current versions of the vibration device 972 and audio generator 974 may use too much power for today's batteries, and so they are configured to turn off when the rest of the system does or at some finite duration after activation.

To make the drawing of FIG. 7 general to a variety of devices, not all components are depicted. The handheld computing device 920 could be used to implement a cellular telephone with additional communication components.

Figure 8:
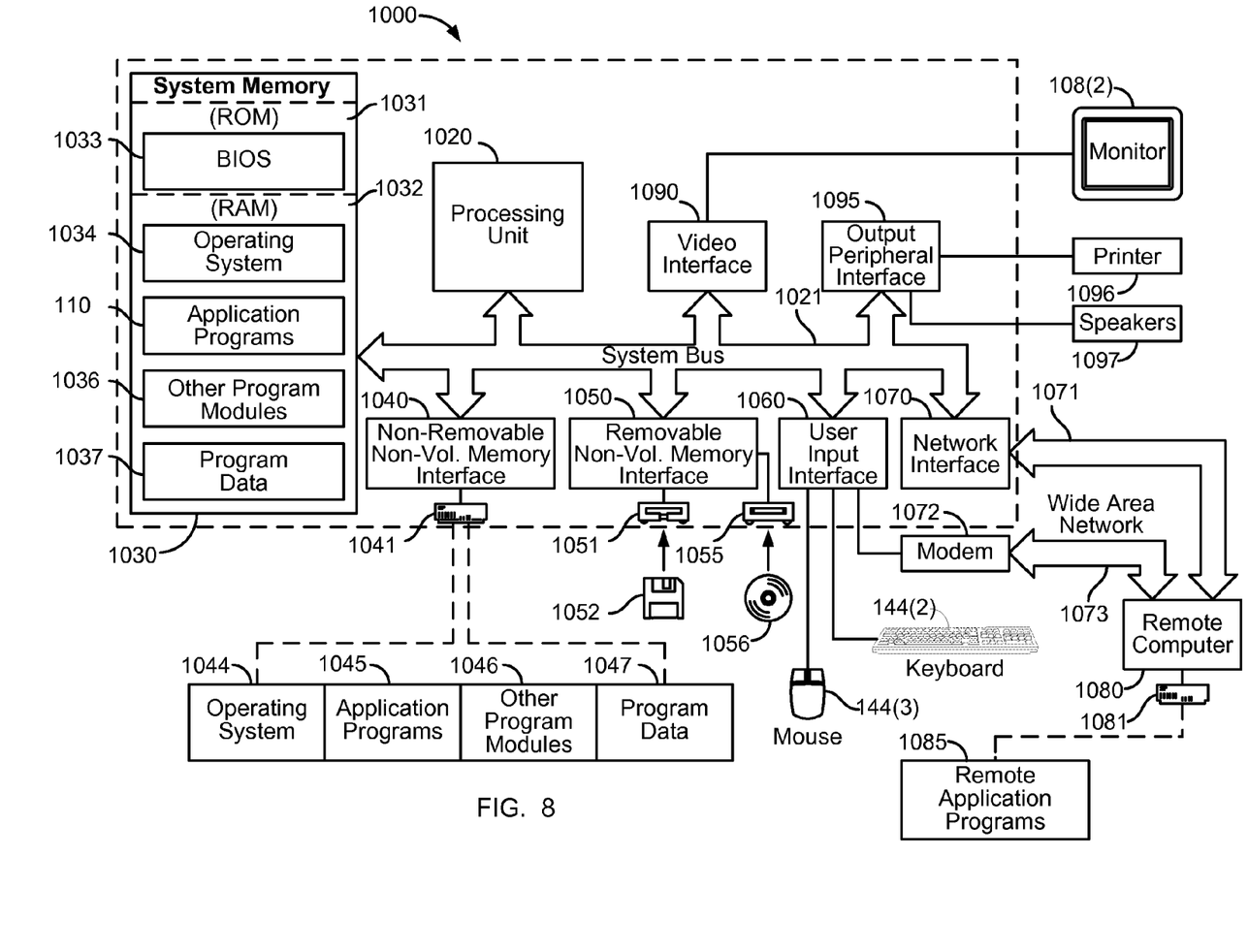
FIG. 8 shows an example configuration of a computer that serves as a platform for some embodiments of the present invention.

With reference to FIG. 8, an exemplary system for implementing some embodiments includes a general purpose computing device in the form of a computer 1000. For example, computer system 1000 may be used to implement electronic devices such as electronic device 100, remote electronic device 112, server 116, etc. Components of computer 1000 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 1030 includes computer storage media in the form of volatile and/or nonvolatile memory such as ROM 1031 and RAM 1032. A basic input/output system (BIOS) 1033, containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 8 illustrates operating system 1034, application programs 110, other program modules 1036, and program data 1037. In one embodiment, the avatar platform 102 is part of the operating system 1034. However, the avatar platform 102 is not required to be part of the operating system 1034.

The computer 1000 may also include other removable/non-removable, volatile/nonvolatile computer storage media. By way of example only, FIG. 8 illustrates a hard disc drive 1041 that reads from or writes to non-removable, nonvolatile magnetic media and a magnetic disc drive 1051 that reads from or writes to a removable, nonvolatile magnetic disc 1052. Computer 1010 may further include an optical media reading device 1055 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 1041 is typically connected to the system bus 1021 through a non-removable memory interface such as interface 1040. Magnetic disc drive 1051 and optical media reading device 1055 are typically connected to the system bus 1021 by a removable memory interface, such as interface 1050.

The drives and their associated computer storage media discussed above and illustrated in FIG. 8, provide storage of computer readable instructions, data structures, program modules and other data for the computer 1000. In FIG. 8, for example, hard disc drive 1041 is illustrated as storing operating system 1044, application programs 1045, other program modules 1046, and program data 1047. These components can either be the same as or different from operating system 1034, application programs 110, other program modules 1036, and program data 1037. Operating system 1034, application programs 110, other program modules 1036, and program data 1037 are given different numbers here to illustrate that, at a minimum, they are different copies.

A user may enter commands and information into the computer 1010 through input devices such as a keyboard 144(2) and a pointing device 144(3), commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus 1021, but may be connected by other interface and bus structures, such as a parallel port, game port or a universal serial bus (USB). A monitor 108(2) or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1000 may operate in a networked environment using logical connections to one or more remote computers, such as a remote computer 1080. The remote computer 1080 may be another electronic device in the shared workspace. However, the remote computer 1080 could be a device that is not in the shared workspace such as a personal computer, a server, a router, a network PC, a peer device or other common network node, and may includes many or all of the elements described above relative to the computer 1000, although only a memory storage device 1081 has been illustrated in FIG. 8. The logical connections depicted in FIG. 8 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1000 is connected to the LAN 1071 through a network interface or adapter 1070. When used in a WAN networking environment, the computer 1010 typically includes a modem 1072 or other means for establishing communication over the WAN 1073, such as the Internet. The modem 1072, which may be internal or external, may be connected to the system bus 1021 via the user input interface 1060, or other appropriate mechanism. In a networked environment, program modules depicted relative to the computer 1000, or portions thereof, may be stored in the remote memory storage device. By way of example, and not limitation, FIG. 8 illustrates remote application programs 1085 as residing on memory device 1081. In some embodiments, remote application programs 1085 include a shared workspace program that is downloaded to computer 1000. It will be appreciated that the network connections shown are exemplary and other means of establishing a communication link between the computers may be used.

While some embodiments are implemented by executing computer readable instructions that are stored on computer readable media, this is not a requirement in all embodiments. Some embodiments may be implemented in hardware or a combination of hardware and software. For example, at least some of the steps of process 200, 300, and/or 500 may be implemented within an ASIC. As a particular example, a portion of the electronic devices 100, 102 may be implemented with an ASIC.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A machine implemented method comprising:
   exposing an application program interface (API) at a first application on an electronic device, wherein the API allows other applications to select from among a plurality of attributes to apply to an avatar;
   presenting in a first user interface on the electronic device, by a second application of the electronic device, a first list of real-life events and a second list that comprises a subset of the plurality of attributes;
   receiving, in the first user interface by the second application of the electronic device, a user selection of a first of the real life events from the first list and a first attribute from the second list to apply to a user's avatar in response to occurrence of the first real life event;
   presenting in a second user interface on the electronic device, by a third application of the electronic device, a third list of real-life events and a fourth list that comprises a subset of the plurality of attributes;
   receiving, in the second user interface by the third application of the electronic device, a user selection of a second of the real life events from the third list and a second attribute from the fourth list to apply to the user's avatar in response to occurrence of the second real life event;
   receiving, via the API at the first application from the second application, a first identifier of the first attribute of the plurality of attributes;
   receiving, via the API at the first application from the third application, a second identifier of the second attribute of the plurality of attributes; and
   causing a user's avatar having the first and second attributes to be presented on the electronic device in response to receiving the first and second identifiers, including the first application providing computer executable instructions to both the second application and the third application that instruct how to present the avatar with both the first attribute and the second attribute.

2. A machine implemented method as recited in claim 1, further comprising:
   determining, by the second application, that the first real-life event associated with the first attribute for the user's avatar has occurred based on information that pertains to the user; and
   determining, by the third application, that the second real-life event associated with second attribute for the user's avatar has occurred based on information that pertains to the user.

3. The machine implemented method of claim 1, further comprising receiving, via the API at the first application from the second application, a third identifier of a third attribute of the plurality of attributes, including receiving an indication that a different user at a different electronic device has sent the third identifier of the third attribute.

4. The method of claim 1, wherein the first attribute specifies both a generic and a specific case for the first attribute.

5. The method of claim 1, wherein the first attribute specifies a generic case but not a specific case for the first attribute, wherein the first application determines the specific case for the first attribute based on the second attribute.

6. The method of claim 1, further comprising the first application storing an indication of a user selected attribute that is to be associated with a user selected event.

7. A machine implemented method comprising:
   presenting in a first user interface on an electronic device, by a first application on the electronic device, a first list of real-life events and a second list that comprises a subset of a plurality of attributes to apply to an avatar;
   receiving, in the first user interface by the first application on the electronic device, a user selection of a first of the real life events from the first list and a first attribute from the second list to apply to a user's avatar in response to occurrence of the first real life event;

presenting in a second user interface on the electronic device, by a second application on the electronic device, a third list of real-life events and a fourth list that comprises a subset of the plurality of attributes;

receiving, in the second user interface by the second application, a user selection of a second of the real life events from the third list and a second attribute from the fourth list to apply to the user's avatar in response to occurrence of the second real life event;

determining, by the first application, that a user's avatar should be updated through an application program interface to a third application in response to occurrence of the first real-life event, the application program interface allows a request that an avatar be presented with specified attributes, the application program interface allows a plurality of attributes to be specified;

transmitting, from the first application to the third application via the application program interface, a first identifier of the first attribute in response to the occurrence of the first real-life event;

transmitting, from the second application to the third application via the application program interface, a second identifier of the second attribute in response to the occurrence of the second real-life event; and presenting on the electronic device the user's avatar having the both the first attribute and the second attribute, including the first application and the second application receiving computer executable instructions from the third application that instruct how to present the avatar with both the first attribute and the second attribute.

8. The machine implemented method of claim 7, further comprising the first application determining which of the plurality of attributes the user should be allowed to control.

9. The machine implemented method of claim 7, further comprising transmitting, from the first application to the third application, information that identifies a third attribute, including transmitting an indication that a different user at a different electronic device has sent the third attribute.

10. The method of claim 7, wherein the transmitting, from the first application to the third application via the application program interface, a first identifier of the first attribute in response to the occurrence of the first real-life event comprises:

the first application sending a numeric value that is defined in the application program interface that corresponds to the first attribute for the avatar.

11. The method of claim 10, wherein the numeric value comprises a multi-byte code, wherein a first byte of the multi-byte code specifies an item to apply to the avatar and a second byte of the multi-byte code specifies a type of the item to apply to the avatar.

12. The method of claim 11, further comprising the first application transmitting a default value for the second byte to the third application via the application program interface, wherein the default value indicates no specific type of the item for the first attribute.

13. The method of claim 12, further comprising the third application selecting the specific type of item for the first attribute based on other attributes of the avatar.

14. The method of claim 12, further comprising the third application selecting the specific type of item for the first attribute based on the second attribute from the second application.

15. An apparatus comprising:
a presentation device;
a processor coupled to the presentation device; and
a computer readable storage device coupled to the processor, the computer readable storage device having computer readable instructions stored thereon, the instructions which when executed on the processor cause the processor to implement:
a platform for presenting avatars on the presentation device, the platform exposes an application programming interface that allows software applications to select from among a plurality of attributes to apply to an avatar, the platform receives a first identifier of a first attribute of the plurality of attributes from a first software application and a second identifier of a second attribute of the plurality of attributes from a second software application, the platform provides computer executable instructions for presenting a user's avatar with the first attribute and the second attribute to both the first software application and the second software application;
wherein the first software application presents a first list of real-life events and a second list that comprises a subset of the plurality of attributes in a first user interface, the first application receives a user selection of a first of the real life events from the first list and a first attribute from the second list to apply to the user's avatar in response to occurrence of the first real life event;
wherein the second software application presents a third list of real-life events and a fourth list that comprises a subset of the plurality of attributes in a second user interface, the second application receives a user selection of a second of the real life events from the third list and a second attribute from the fourth list to apply to the user's avatar in response to occurrence of the second real life event.

16. The apparatus of claim 15, wherein the instructions which when executed on the processor further cause the processor to determine by the first software application the first attribute for the user's avatar based on information that pertains to the user.

17. The apparatus of claim 16, wherein the instructions which when executed on the processor further cause the processor to receive user input that is used to determine how the user's avatar should be presented in response to the information.

18. The apparatus of claim 15, wherein the instructions which when executed on the processor further cause the processor to receive an indication that a different user at a different electronic device has sent a third attribute, present a message on the presentation device asking whether the user's avatar should be modified based on the third attribute.

19. The apparatus of claim 15, wherein the first software application is one of a contact application, an email application, an instant messaging application, a calendar application, or a music player.

20. The apparatus of claim 15, wherein the platform receives a request from a software application that is remote from the apparatus to present the user's avatar with a third attribute of the plurality of attributes, the platform modifies the user's avatar based on the third attribute.

* * * * *